H. W. FALCONER.
IDENTIFYING MEANS FOR AUTOMOBILES.
APPLICATION FILED MAR. 3, 1919.
1,375,370.   Patented Apr. 19, 1921.
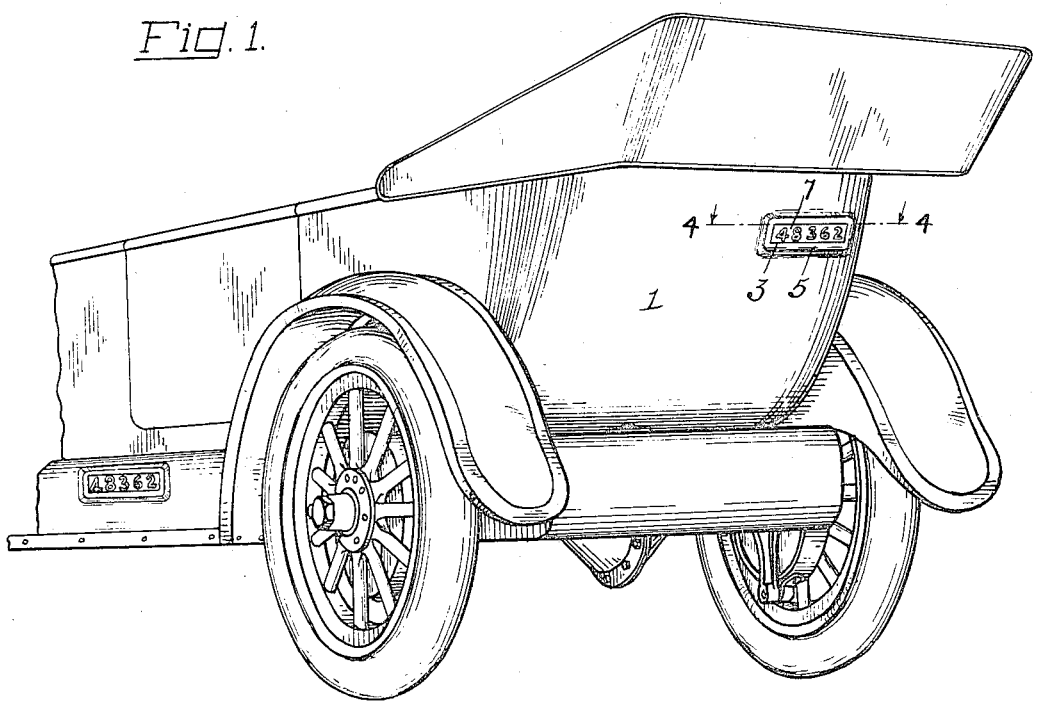
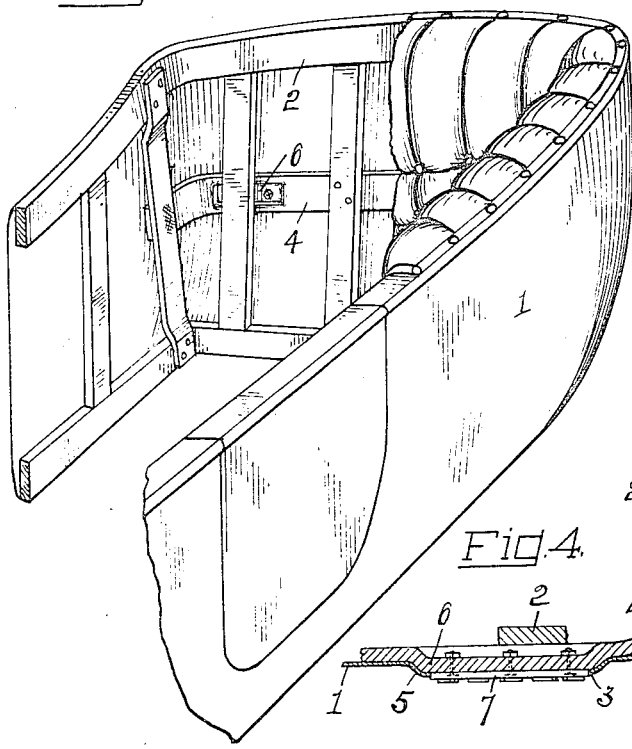
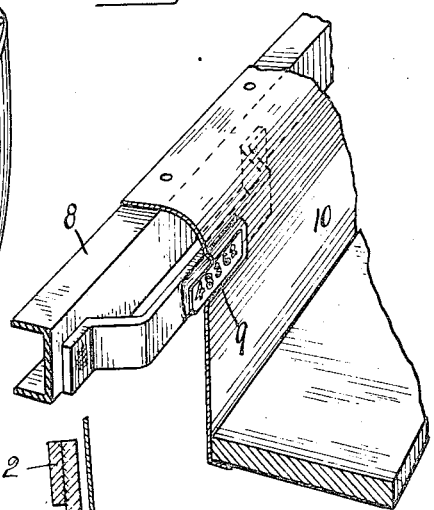
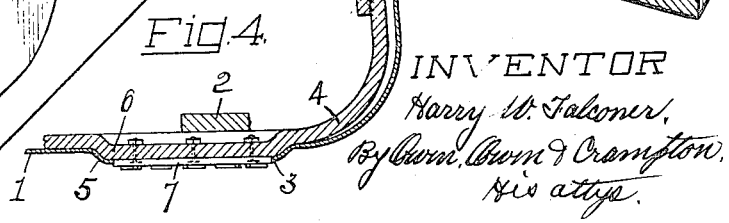
INVENTOR
Harry W. Falconer,
By Owen, Owen & Crampton,
his attys.

UNITED STATES PATENT OFFICE.

HARRY W. FALCONER, OF WOOD COUNTY, NEAR PERRYSBURG, OHIO.

IDENTIFYING MEANS FOR AUTOMOBILES.

1,375,370.  Specification of Letters Patent.  Patented Apr. 19, 1921.

Application filed March 3, 1919. Serial No. 280,204.

*To all whom it may concern:*

Be it known that I, HARRY W. FALCONER, a citizen of the United States, and a resident of the county of Wood and State of Ohio, near Perrysburg, Ohio, have invented a certain new and useful Identifying Means for Automobiles; and I do hereby declare the following to be a full, clear, and exact description of the invention, such as will enable others skilled in the art to which it appertains to make and use the same, reference being had to the accompanying drawings, and to the characters of reference marked thereon, which forms a part of this specification.

This invention relates particularly to identification means for automobiles to lessen the liability of stealing the same, and has for its object the provision of a simple and efficient means of this class which is inexpensive to apply, effective in its use and difficult to remove or obliterate without arousing suspicion.

The invention is fully described in the following specification, and while, in its broader aspect, it is capable of embodiment in numerous forms, a preferred embodiment thereof is illustrated in the accompanying drawings, in which—

Figure 1 is a perspective view of the rear portion of an automobile embodying the invention. Fig. 2 is a top perspective view of a portion of an automobile body with the portion of the upholstering removed to illustrate the manner of securing the identification means to the body frame. Fig. 3 is a fragmentary perspective view of a different portion of the automobile with the invention associated therewith, and Fig. 4 is an enlarged section on the line 4—4 in Fig. 1.

Referring to the drawings, 1 designates the casing of an automobile body, and 2 the frame thereof.

At any convenient or desired point the body casing 1 may be provided with an opening 3, and disposed at the rear or inner side of this opening and rigidly secured to the frame 2, or other adjacent support, is a plate or member 4. The marginal edge wall of the opening 3 is preferably bulged outwardly in dished or concavo-convex form in cross-section as shown at 5, to receive a complemental outwardly bulged portion 6 of the plate or member 4, which is intended to fit closely therein. The outer side of the bulge 6 is provided with a plate or block 7, preferably of glazed material, such, for instance, as porcelain or earthenware, having a designating mark or number thereon and being of suitable shape and size to project through and fill the casing opening 3. The plate or block 7 may be secured to the member 4 in any suitable manner.

The background for the mark or number or the mark itself may be of any desired color, certain colors, if desired, being used for certain predetermined districts or sections of a country to facilitate locating a stolen automobile. For instance, if an automobile sold for use in Ohio has the identifying number or the background thereof blue, the car, if stolen, can be more readily located and identified in another State or Territory where the color of the background or identifying number of automobiles sold for use therein is different.

The designating mark or number may be secured to any other suitable or convenient portion of the automobile, as for instance, to the side bar 8 of the chassis frame, and projected through an opening 9, in the side casing 10, which extends up from the running board.

It is evident that should the identification plate or block 7 be removed, the space within the casing opening is either blank or open, thus tending to arouse suspicion. It is preferable to have the identification plate of a different material from that of the casing thereby rendering it more attractive.

I wish it understood that my invention is not limited to any specific construction, arrangement or form of the parts as it is capable of numerous modifications and changes without departing from the spirit of the claim.

Havink thus described my invention, what I claim as new, and desire to secure by Letters Patent, is—

In an automobile, a frame, a casing without said frame having an opening therein, said opening having its marginal edge wall outwardly bulged, and means fixed to said frame and having an outwardly protuberant portion complemental to and fitting into the bulged wall of said opening, and said protuberant portion having an identification part in register with said opening.

In testimony whereof, I have hereunto signed my name to this specification.

HARRY W. FALCONER.